United States Patent [19]
Curby

[11] 3,919,050
[45] Nov. 11, 1975

[54] MICROPARTICLE ANALYSIS

[75] Inventor: William A. Curby, West Newton, Mass.

[73] Assignee: Lahey Clinic Foundation, Inc., Boston, Mass.

[22] Filed: May 28, 1974

[21] Appl. No.: 473,498

[52] U.S. Cl. .................... 195/103.5 R; 324/71 CP
[51] Int. Cl.² ........................................ C12K 1/04
[58] Field of Search .......... 195/103.5 R; 324/71 R; 324/71 CP

[56] References Cited
UNITED STATES PATENTS
3,804,720   4/1974   Curley ....................... 195/103.5 R Primary Examiner—A. Louis Monacell
Assistant Examiner—Robert J. Warden
Attorney, Agent, or Firm—Mellor A. Gill

[57] ABSTRACT

A method for analyzing the dimensional characteristics of micron or submicron-sized bodies such as particles, cells, organisms, and the like, by using particle detecting means to produce an electrical primary pulse as a function of a dimensional index of the bodies, and thereafter feeding the primary pulse to secondary pulse-producing means, which means are triggered at different time intervals during the duration of the primary pulse or during the duration of a number of primary pulses generated by the same type of bodies such that a plurality of secondary pulses are produced. These secondary pulses, each having an amplitude reflecting the relative amplitude of the primary pulse at the time of triggering, are produced for subsequent use to reflect the shape of the primary pulse such that a characterization of the bodies being analyzed can thereby be obtained. The secondary pulses not only can be used either to profile the primary pulse or to permit the area integration thereof, but the technique of a multi-point triggering of secondary pulses is useful also in biological particle total count and size distribution assay methods in that the "signature" of the particle population being studied is meaningfully emphasized even if only a single-pass sample run is employed.

21 Claims, 14 Drawing Figures

REPRESENTATIVE PULSE SHAPE:
HUMAN ADULT MALE ERYTHROCYTE
(IN 0.9% W/V SALINE)

a. 8 MICROSECOND DELAY TRIGGER b. 25 MICROSECOND DELAY TRIGGER

PARTICLE DIAMETER
— 8 μSEC TRIGGER
--- 25 USEC TRIGGER ON A SYMMETRICAL HIGHLY UNIFORM PULSE POPULATION
—·— 25 USEC TRIGGER ON A SEMI-RANDOM MIXED PULSE POPULATION

MICROPARTICLE ANALYSIS

FIELD OF THE INVENTION

The present invention relates to a method for analyzing the dimensional characteristics of micron and sub-micron-sized bodies and, more particularly, the invention relates to a microparticle analysis technique utilizing a sensor which produces an electric pulse upon sensing each particle and in which secondary pulses are triggered during the duration of the primary pulse to provide information relating thereto.

DESCRIPTION OF THE PRIOR ART

The attainment of an instrumented automatic or semi-automatic microbiological and bacteriological assay process has been sought by investigators in the art for well over a decade. A number of the approaches considered have had some success in the utilization of high-resolution optical scanning instruments in attempts to mimic the human eye. These instruments are generally quite complex, requiring highly trained personnel for their operation, and are not geared for large volume, high-speed analysis and rapid data output. Other approaches designed to attain an effective, inexpensive assay process have been employed, but most of them require processing techniques that degrade their value in any routine screening, test, or analysis usage which could be suitably employed in most laboratories.

Approaches that have achieved significant success are based on the computer analysis of the output from sensing devices such as, for example, flow-through systems having a sensor output coupled to the computing means. In flow-through systems, the specimen body or particle is suspended in a fluid medium and the medium containing the fluid is caused to flow through the sensing means to obtain the desired data therefrom. Flow-through systems for handling test specimens enable maximum advantage to be taken of the speed and utility of automatic and semi-automatic assay processes.

An assay method invented by me and using a flow-through system in which the particle sensing means is coupled to a multichannel analyzing system has been applied successfully to the study of bacteria, mammalian and fish blood, algae, inert dusts, ocean sediments, fluid droplets, and the like. In that method of my invention, which is the subject of U.S. Pat. No. 3,804,720, and assigned to the assignee of the instant invention, and which is hereby incorporated by reference, a particle sensor such as an optical particle densitometer or relfectometer, or a sensor operating on the Coulter principle is employed. In operative association with the sensor is a multichannel analyzer, data manipulation equipment, analog or digital reporting equipment, and circuitry for the interfacing thereof. As an alternate embodiment, the sensor may be directly interconnected to suitable recording means such as magnetic tape or other suitable data storage equipment. Thereafter, in such alternate embodiment, the stored data can be fed into the multichannel analyzer or a variable threshold loop recycle technique can be employed.

Particle sensor or sensor pulse generating means using optical or electrical principles can be employed in this invention. An example of such electrical means are those using the well-known Coulter principle as described in U.S Pat. Nos. 2,656,508 and 2,869,078, which are hereby incorporated by reference. A description of optical sensing means embodied in the invention is given, however, to facilitate the exposition of this invention, emphasis is placed on a system using a Coulter Counter. It will be understood, of course, that such emphasis is not to be taken to imply any limitation with respect to the type of particle sensing means used in this invention.

In the Coulter sensing principle, when a particle in suspension in an electrolyte is passed through an electrical field having dimensions related to those of the particle, there will be a momentary change in the electrical impedance/resistance of the electrolyte in the ambit of the field. This change of impedance/resistance diverts some of the excitation energy into associated electrical circuitry giving rise to an electrical signal. By counting the signals produced, a count can be obtained of the number of particles passing through the aperture. If a discrimination is made between the amplitudes of the signals, particle size studies can be made. This invention is primarily concerned with the analysis of the shape of the signal such that data relating to other characteristics of the particles can also be obtained.

In Coulter-type particle analyzing apparatus, the electrical field used for particle detection if formed in a right cylindrical passageway or aperture between two bodies of a fluid in which the particles to be studied are suspended. The electrical excitation energy is coupled to these fluid bodies by means of electrodes immersed therein, the aperture being formed in an insulating wall between the bodies. The fluid carrying the particles in suspension is caused to flow through the aperture, giving rise to electrical signals as each particle passing through the aperture produces a momentary change in impedance/resistance. The electrical field is concentrated in the aperture which serves as the sensing zone and that field normally comprises an electric current flowing through the aperture along with the physical flow of suspension. It will be appreciated that, as a particle passes through the sensing zone, it displaces its own volume of the electrolyte; this increases the impedance/resistance between the electrodes, resulting in an electrical signal. Response depends substantially on the exposed cross-sectional area of the particle and upon the aperture characteristics, such as diameter and length, particle residence time and path through the aperture, and the like, and is usually independent of the dielectric properties of the particle. (The contribution of fixed charge on the particles generally is small at normal ionic strengths and can normally be ignored.) As is also known, porous regions present in the particles will tend to produce a decrease in the apparent volume of an electrically sensed particle, as is the case with certain bacteria. This phenomenum may be termed "electrical transparency." In the particle sensor embodied in this invention, the electrically conductve fluid suspension is drawn as a result of a pressure differential through the electric field in the aperture which is located in the wall of an electrically insulating vessel containing one electrode. The other electrode is mounted in a larger vessel containing the specimen which is to be passed through the electric field for testing.

It will be appreciated that the parameters of the sensor aperture must be chosen carefully to obtain optimum performance for particle analysis. The aperture cannot be too large in diameter relative to the size of the particle since the resultant signal due to the passage of a particle may approach the electrical noise in the system. Conversely, the aperture should not be too small in diameter since this both restricts fluid flow, requiring higher pressure differentials for a given flow rate, and it also may lead to plugging of the aperture by debris in the suspension.

In addition to diameter, the length of the passageway or aperture "tunnel" is an important parameter. Apertures are classified in the art as being either "long" or "short": a long aperture may be considered to be one in which the length of the passageway is greater than the diameter, a short aperture is considered to be one in which the length is the same or less than its diameter. In conventional practice, an aperture too short in the direction of flow is generally not desired because such configuration leads to difficulties in obtaining uniform electrical fields in the sensing area; however, due to the high sensitivity and empirical nature of the particle assay method of my invention, short or even "knife-edge" apertures can be used successfully for useful analysis of particle populations.

It is known that long aperture tunnels can produce results generally superior to short tunnels insofar as size measurements are concerned if the bandwidth of the associated amplifiers are selected accordingly. Better size information if generally produced with long tunnels because the greater tunnel length reduces the entrance and exit effects and, thus, results in a more uniform field which has the more uniform current distribution for all particle paths through the aperture. The longer the tunnel, therefore, the more nearly uniform is the field at the midpoint. At the entrance and exit of the tunnel, the current density is greater at the edges of the aperture and is correspondingly less on the axis. This field pattern is due to the fact that current paths other than the axial path are supplied from the sides of the aperture as well as straight ahead. The lower current density on the axis at the entrance and exit results in a lower instantaneous signal than is the case for particles entering and leaving the aperture on other current paths.

It is known also that the velocity of flow of the electrolyte, and hence the velocity of the particles, is somewhat greater on an axial tunnel path than on paths displaced therefrom. As is known from hydrodynamcis, the resistance to fluid flow is a minimum on the tunnel axis since it is surrounded by a moving sheath of fluid having substantially the same velocity.

From a practical standpoint, therefore, consideration must be given to certain tunnel operating characteristics which are reflected in the electrical output signals when a suspension of particles is passed through the sensing aperture of an electrical particle analyzing device such as, for example, the Coulter Counter. Since the physical length of the tunnel is constant, and the rate of suspensison flow is considered to remain constant, it should follow that all electrical output pulses produced by particles of the same size sensed in the tunnel should have the same amplitude and duration. That this is not true has been known for some time as it has been recognized, as discussed previously, that the rate of fluid flow is maximum and the current density distribution is most uniform on the axial centerline of the tunnel. Because of these hydrodynamic and electrical considerations, and because of entrance and exit effects, therefore, a particle passing through the tunnel on some path having an angular relationship with the axis, or on a path coaxial with the axis but displaced therefrom in a direction away from the axial centerline, will not have the same rate of travel through the sensing zone or produce a signal of the same strength as an identical particle entering the tunnel on the axial centerline, and maintaining a path thereon, and the detector output pulse will not have the same amplitude, profile, and duration. However, as will be discussed further, in the method of my invention, the assay data used is catalogued empirically such that the aforementioned sensor pulse variations will fall within the range of precision required to permit an effective assessment to be made of the test specimens.

The Coulter particle sensor has no theoretical lower limit with respect to the size of the particle which can be measured. Practical limitations result from considerations such as the selection of the aperture dimensions, the cleanliness of the electrolyte in which the particles are suspended, and the electronic noise level in the amplification of the pulses generated by the sensor. For monitoring of bacteria from body fluids, for example, applicant has found that an aperture size of between 10 $\mu$ and 200 $\mu$ in diameter is suitable for use in the monitoring of particles having an apparent diameter of from 0.1 $\mu$ to 50.0 $\mu$. It is preferred to operate with an aperture size of from 30 $\mu$ to 100 $\mu$ for the routine monitoring of particles having an apparent diameter of 0.2 $\mu$ to 20.0 $\mu$.

In the referenced assay method of my invention, the output from the sensor is connected through suitable matching and amplifying circuits to a pulse height analyzer which has means for correlating the height of the pulse with a corresponding channel number. Means are also provided for tabulating the number of pulses falling into a particular channel and for displaying the stored data as a hard copy readout. There also may be means provided for conversion to analog form for X-Y display on an oscilloscope or a X-Y hard copy plotter.

A suitable pulse height analyzer is the RIDL-34-20 which is manufactured by Radiation Instrument Development Laboratory, which is now part of Searle Analytic, Inc., Des Plains, Ill. 60018. This particular analyzer has 200 channels but other analyzers having greater or a lesser number of channels may be employed. The RIDL-34-20 may be employed with a Hewlett-Packard 120 B oscilloscope, marketed by Hewlett-Packard Co., San Diego, Calif. 92127, as a monitor, and includes a tape readout, locator and scan repeater, an impedance matching circuit, a pulse amplitude analyzer and integrater, an analog to digital converter, a $4 \times 10^4$ bit core storage unit, and a 200 multi-channel CRT display. A Mosley 7035 X-Y plotter (also manufactured by Hewlett-Packard) provides an analog readout.

In the applicant's referenced assay method recited in U.S. Pat. No. 3,804,720, the objects of the invention ae accomplished by an analysis of the total count and size distribution of the particulate matter being studied. I have found, however, in specific studies such as, for example, blood cell analysis, that the value of the studies is greatly enhanced if pulse shape analysis is used to provide useful information with respect to changes in the shapes of the individual particles themselves.

DESCRIPTION OF THE PREFERRED EMBODIMENTS

It is to be understood that the term "pulse shape analysis" as used herein is intended to encompasss analyzing techniques such as, for example, pulse profiling and profile integration. It should also be understood that, for specific details not delineated of apparatus in the following description of the instant invention, reference should be made to the description of my assay method invention referenced previously. Also, to facilitate the exposition of the invention and avoid prolixity, the sensors are recited as being one operating on the differential conductivity principle of Coulter or as being embodied in detectors using optical principles and employing laser and xenon lamp light sources; however, as discussed herein previously, such emphasis is not intended as a limitation on the type of sensor suitable for use in the method of the invention as it is recognized that electrical output pulses useful in the practice of the invention can be produced by optical and electrical sensors other than those described herein.

Figure 1:
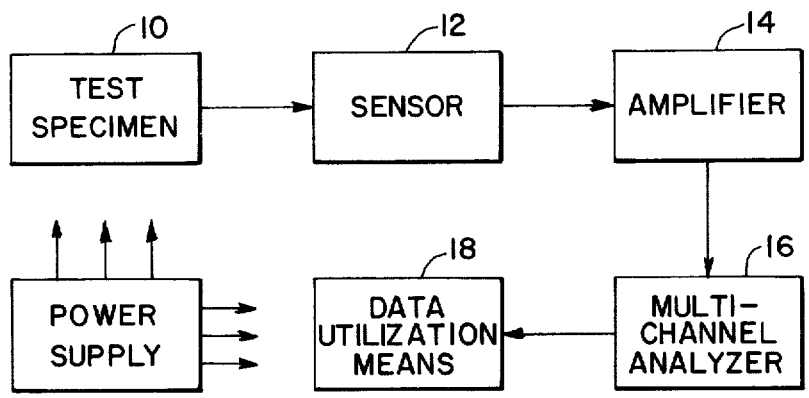
FIG. 1 is a functional block diagram for the analysis of microparticles in accordance with the invention.

Referring now to FIG. 1, the electrolytic medium containing the particles or bodies 10 to be analyzed is passed through the sensing or detecting unit 12. Sensor 12 is of any suitable type and I have had success with the type operating in accordance with the Coulter principle that has a manometer element to draw a precisely metered quantity of the specimen fluid through the sensing aperture of the particle counter. As described previously, the conductive fluid carrying the test particles is passed through an aperture through which an electric current is flowing. Each time a particle passes through the aperture, the current flux density is altered in the aperture, causing a change in potential across the aperture. The change in potential is amplified by suitable amplifying means 14 and various parameters of the change in potential or pulse are measured in the multichannel analyzer 16 and the output thereof is passed to suitable data utilization means 18 for display, recording, and the like.

Figure 2:
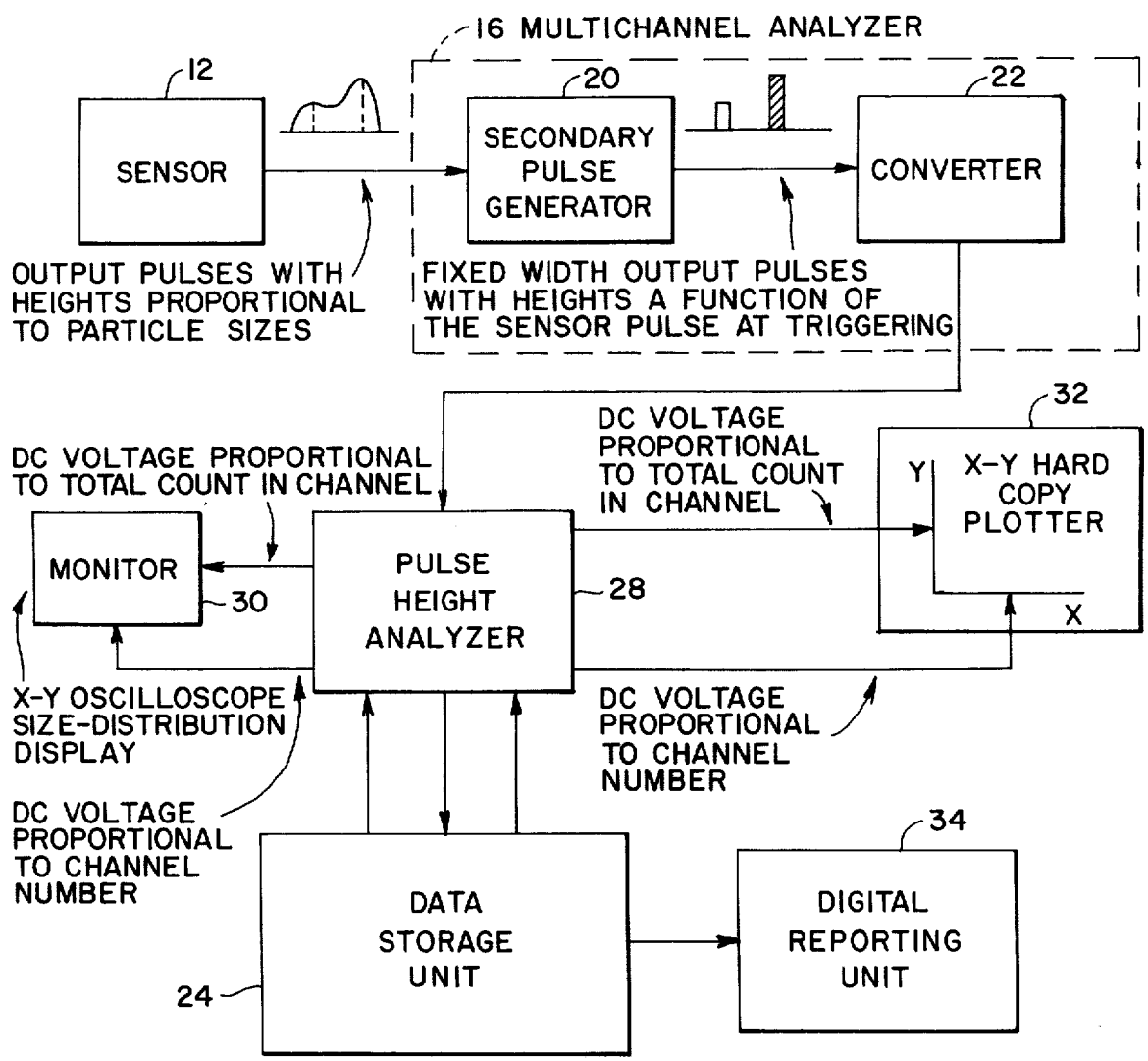
FIG. 2 is a functional block diagram of the analysis means embodied in the invention illustrating in greater detail the system of FIG. 1.

The output from sensing unit 12 is in the form of pulses whose amplitudes or heights are proportional to the sizes of the particles and whose durations are a function of the aperture diameter and tunnel length, the flow rate, and the like characteristics of the sensing unit. Sensing unit 12 thus may be considered to be the primary pulse generating means, the output of which is operated upon by the pulse shaping means of a secondary pulse generator 20 (FIG. 2) to produce output pulses of fixed width having a height or amplitude proportional at the time of triggering of the secondary pulses to the amplitude of the primary pulse produced by the particle passing through the sensing unit. The secondary pulses are processed through converter 22 which assigns channel number addresses proportional to pulse heights. This output is coupled through interfacing and is measured in the pulse height analyzing means 28 of the multichannel analyzer 16 and the output is passed to the data storage unit 24 in which each pulse is assigned a position or channel on what may be considered to be the X axis thereof. This axis is divided into any suitable number of channels as, for example, the 200 channels of this embodiment, each channel accepting pulses of a specific amplitude. Each time a pulse of the same height is measured, one more count is added to that particular channel. Tabulations are made of the total count (Px) of pulses of each specific amplitude assigned to each of the 200 channels. Access may be had at the end of a test run or at any instant during the run to data entered in the storage means such that a readout is available at any time of the pulses tabulated in the channels. Pulse height analyzer 28 processes the data from multichannel analyzer 16 and the output thereof is converted to analog form for use as an X-Y display on an oscilloscope of monitor 30 or in X-Y hard copy plotter 32. The data recorded in analog form has an ordinate which is a dc voltage proportional to the total count in a channel and an abscissa which is a dc voltage proportional to the channel number. Storage unit 24 may feed a digital output to digital printed tape reporting equipment 34 if a decimal printout is desired, or the data can be recorded on magnetic tape or in the memory bank of a time-shared computer.

Figure 3:
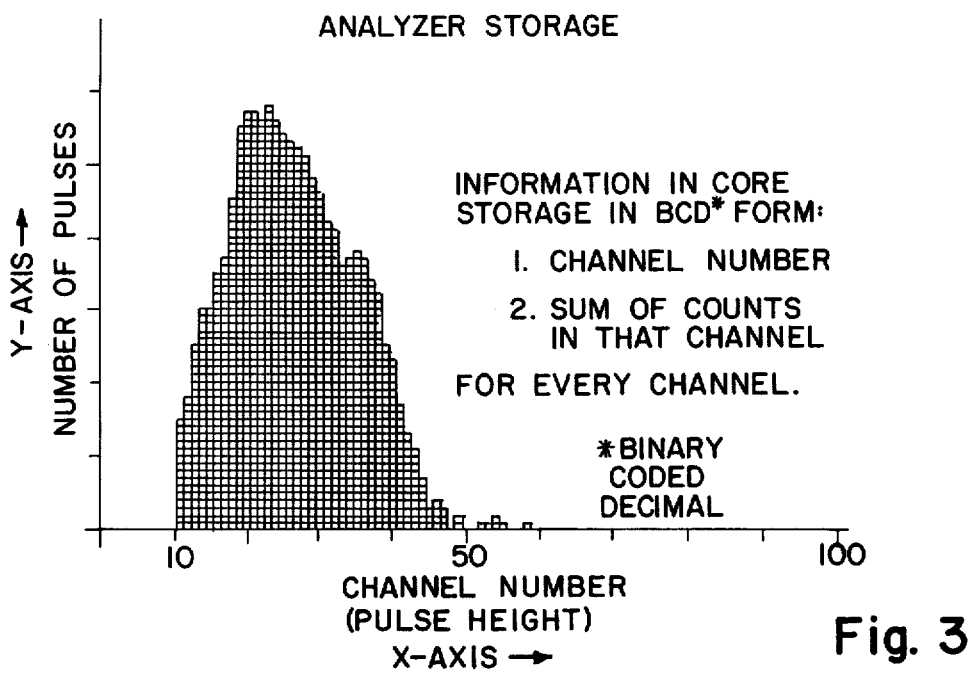
FIG. 3 is a graph showing an X-Y display of digital output data of an embodiment of the invention.
Figure 4:
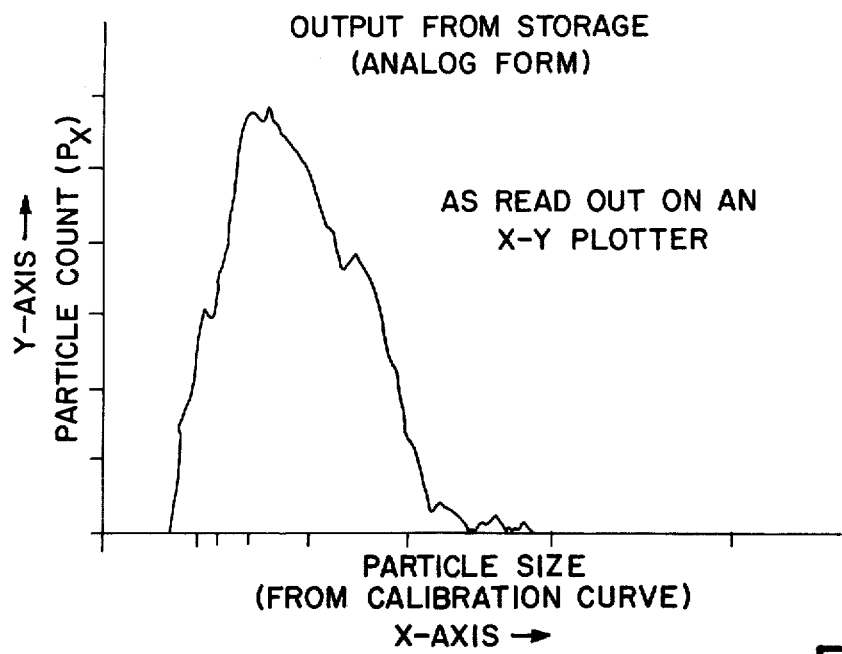
FIG. 4 is a graph showing an X-Y display of analog output data of an embodiment of the invention.
Figure 5:
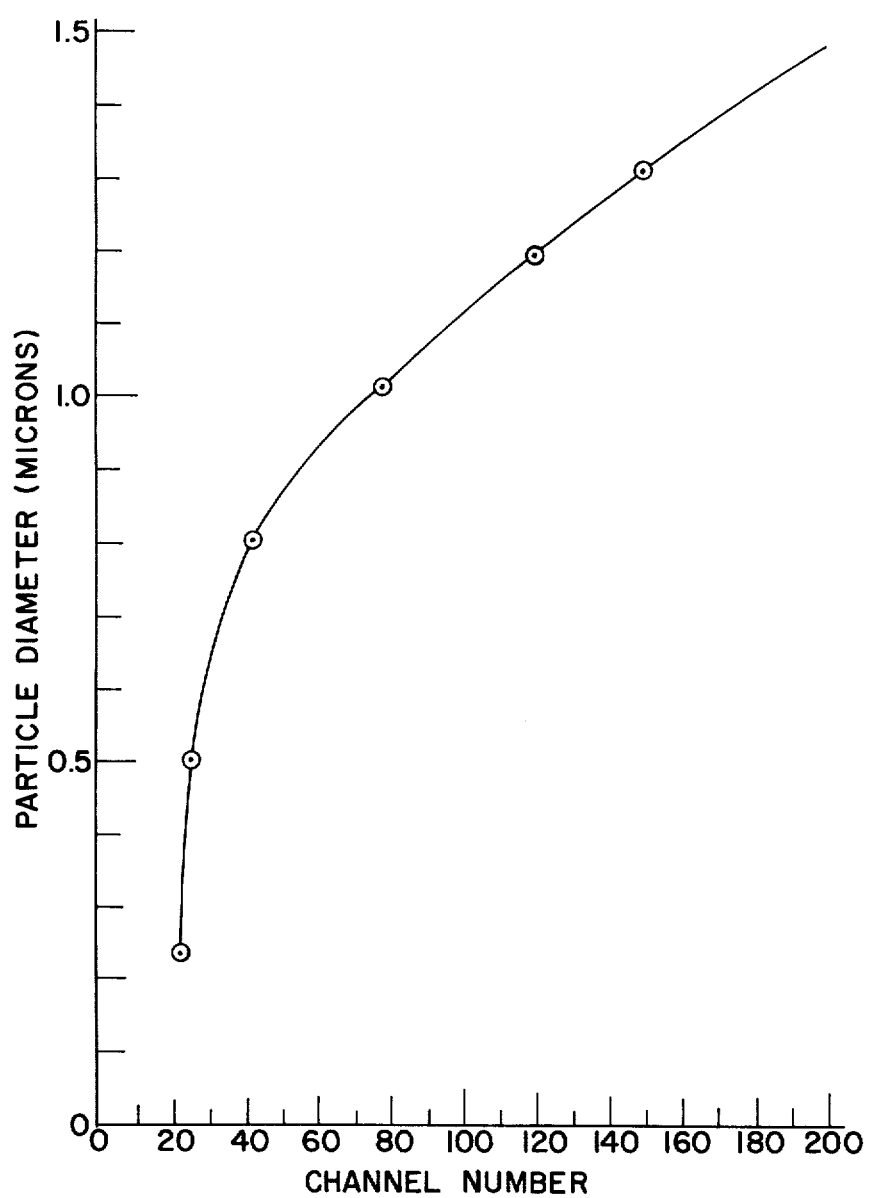
FIG. 5 is a graph which illustrates a calibration curve for equipment embodied in the invention.

In operation of the system of this invention, each time a particle passes through the sensing unit 12 an output voltage pulse is produced. By suitably controlling the flow of the fluid in which the particles are suspended to produce a required constant rate of flow through the sensor, the passage of a number of spherical particles through the sensor will produce a series of voltage pulses which are approximately 20 microseconds in duration and which have an amplitude proportional to the size of the particles. Assuming the use of a multichannel analyzer having a 100-channel storage, a digital record of the sample run of a number of spherical particles would be displayed as shown in FIG. 3. In FIG. 3, the X-axis of the presentation contains the channels in which the particles are tabulated by size, progression in size according to increasing particle diameter being from left to right. The number of particles that have been tabulated in accordance to size are recorded on the Y-axis and will be displayed by blocks in the channel dedicated to particles of that size. In an analog presentation of the same sample run, since different particle sizes cause different changes in potential across the aperture, the resulting output of the analyzer is summarized in a cumulative frequency curve which is a plot of the number of particles in a given channel, i.e., of a given size, against the increasing volumes of the particles; the 100-channel storage analog output would be displayed as a voltage on the Y-axis proportional to the number of pulses stored in each channel, progressing from channel 1 on the X-axis of the display as depicted in FIG. 4. Since there is a one-to-one relationship to the pulses generated by the sensor, the X-axis readout provides an accurate representation of the particles counted if certain conditions are met. As is known in sensing systems of this type, the X-axis absolute scale will vary depending upon the values of the control parameters set into the system. For each specific operating condition set into the system, a calibration curve such as that shown in FIG. 5 is prepared using suitable spheres of known sizes as standards. I have found the polystyrene and polyrinyltoluene latex spheres manufactured for the purpose by the Dow Chemical Company, Bioproducts Division, Midland, Mich. 48641, to be suitable for the requirements.

For ease of comparision, the curves are calibrated on the basis of particle diameter rather than on particle volume. A calibration on the basis of volume is possible, however, if such is desired.

Total counts can be obtained from the X-Y plots using the following relationship:

$$P = S \sum_{x_{min}}^{x_{max}} P_x \cdot x$$

Where
P = the total particle count
$P_x$ = the particle count per x increment ($\Delta x$) and
S = scale factor (as set within the equipment)

The $x$ increment is usually taken as the width of one channel, in which case, for dilute solutions, the integration constant may be taken as unity. The determination of $x_{min}$ and $x_{max}$ is made in accordance with the region of interest, $x_{min} \geq 0$ and $x_{max} \leq n$; ($n$ equals the channel capacity of the storage system).

It will be appreciated that the foregoing description sets forth the analysis of a sample run in terms of the total count and size distribution of the particles therein. To determine other physical characteristics of the particles being analyzed, particularly with respect to organisms and cells, it is required that a particle/pulse shape analysis be done. The method of analysis of this invention describes a process for making such pulses shape analysis employing substantially the same equipment used in the total count and size distribution process.

For optimum performance, pulse height analysis using the Coulter type sensing means requires that the flow rate of the fluid carrying the particles through the sensing zone be absolutely precise. With a constant flow rate and an appropriate aperture configuration, the durations of pulses generated by spheres of equal size will be equal. With a flow rate normally available in equipment of this type, pulses of approximately 20 microseconds duration (base to base) are generated when spheres of 1-micron diameter traverse a 30-micron sensor aperture having a tunnel length of approximately 40 microns. The geometry and flow rate characteristics are such that pulses of the same order are produced by 2.7-micron diameter spheres passing through a 100-micron aperture having a similar 40-micron tunnel length.

Figure 6:
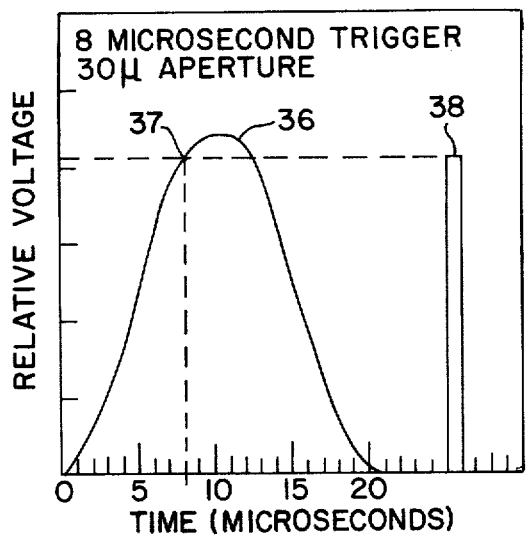
FIG. 6 is a graph illustrating a wave form of electrical pulses used in the invention.

The primary pulses 36, FIG. 6, produced by sensing unit 12 upon detection of spherical particles passing through the sensing zone have bilateral symmetry peaking at about 10 microseconds. In this invention, the secondary pulse generator 20 is normally set to trigger the production of a 1-microsecond wide square wave pulse 38 having an amplitude which is linearly proportional to the voltage of the primary pulse 36 produced by the sensor at the exact instant of the triggering of the secondary pulse. In the example of FIG. 6, the secondary pulse was triggered 37 at 8 microseconds into the primary pulse. In this equipment, as the diameter of the sphere increases, the pulse duration increases, but with a much smaller magnitude than the pulse amplitude at the gain settings normally used for routine analysis.

Figure 7:
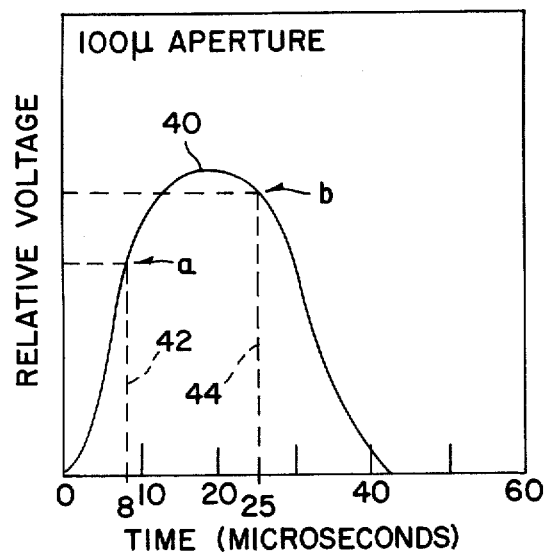
FIG. 7 is a graph of a wave form of a primary electrical pulse showing the time of triggering of secondary pulses in accordance with the invention.

To illustrate an embodiment of a pulse shape analysis technique of this invention, attention is directed to FIG. 7. FIG. 7 shows the type of primary pulse 40 normally produced by sensing unit 12 when samples of human erythrocytes which have been diluted in 0.9% w/v particle free saline are passed through a 100-micron aperture in the sensor. A sample run will produce a pulse train which is made up of a population of pulses that differ from one another only slightly. With the secondary pulse generator 20 set to trigger at 8 microseconds into the pulse (DM = 8 microseconds), secondary voltage pulses 42 having amplitudes proportional to the sensor voltage at point $a$ will be produced. Should the delay trigger of the secondary pulse generator be set to produce a secondary pulse at 25 microseconds after initiation of the primary pulse, secondary pulses 44 of a voltage proportional to the primary pulse voltage at point $b$ will be produced.

Figure 8:
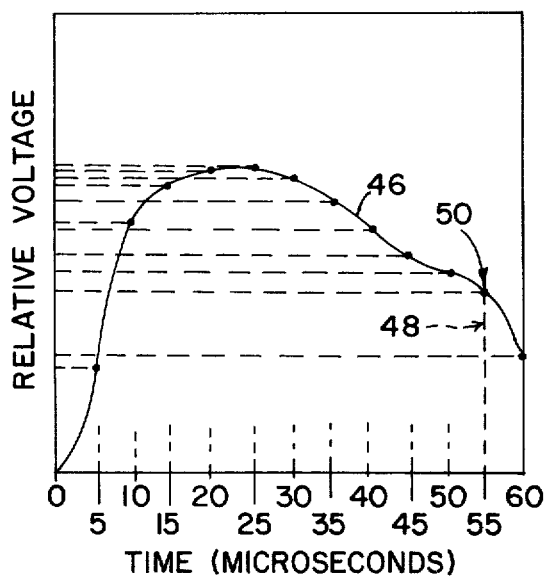
FIG. 8 is a graph of a wave form of a primary electrical pulse showing the time of triggering of secondary pulses in accordance with a further embodiment of the invention.

Triggering the secondary pulses generator a multiplicity of times into the primary pulses will produce a series of secondary pulses than can be used to determine various characteristics such as the shape of the primary pulse (FIG. 8) which, in turn, provides dimensional information pertinent to the particle initiating the primary pulse. As shown, the triggering of the secondary pulse generator at time intervals of, for example, every 5 microseconds into the primary pulse 46, produces a series of secondary pulses indicated at 48 having amplitudes proportional to the sensor voltage at points indicated at 50. (It is understood, of course, that the depiction in the drawings of one pulse superimposed on another is merely for the convenience of exposition and it is not intended to illustrate any particular readout display. The secondary pulses can serve to profile the primary pulse, or the area under each of the secondary pulses can be integrated and then summed such that information as to various characteristics of the particles being detected can be obtained. Regardless of the sensor used, the pulse shape generated as a particle passes through the sensing means gives information about that particle. By measuring the amplitude of the pulse at time intervals during the life of the pulse, it is possible to obtain knowledge about the shape of the pulse. If the time intervals are set closer together, more knowledge of the amplitude of the pulse as a function of time is obtained. Referring to FIG. 8, it can be seen that if the voltages which disclose the pulse amplitude are recorded in time sequence on a magnetic tape or in analog or digital form in a suitable computer storage system, the profile of the pulse can be reconstructed. Reconstruction is accomplished by feeding the sequentially stored pulses into the X-Y plotter, or by repetitively feeding the stored information into the Y axis input of the oscilloscope and triggering the X sweep each time the stored information is at the beginning of the repeat cycle. We have heretofore disclosed the relation of the pulse amplitude profile to the size and shape of the particle. There are times in which information as to the volumes of irregular shaped and sized particles is of interest. If the secondary amplitude-related pulses are sequential, it will be appreciated that they may be accumulated and thereby provide a measure of the area under the pulse curve by simple Simpson's Rule intergration. By accumulating the summed amplitude voltages in a suitable operational amplifier system such as, for example, a Tektronix 3A8 (Tektronix, Inc., Beaverton, Oregon 97005). A summation of the particles' volumes can be stored by the operational amplifier. The output of the amplifier can be calibrated using particles of known shape-volume characteristics. By dividing the accumulated shape-volume number by the number of particles producing the sampled pulses, a mean cell volume value can be determined regardless of the variations of sizes and shapes of the particles in the sample.

Figure 9:
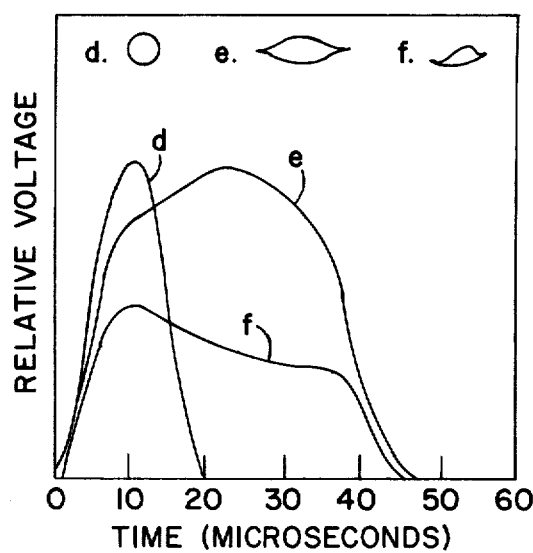
FIG. 9 is a graph illustrating wave forms of primary electrical pulses derived in accordance with the invention and the shape of the particles associated therewith.

Interpretation by a multi-point trigger delay can be made of the shape of a particle if an empirical analysis of the shapes of the pulses in the sensor pulse array being studied is made. Empirical observations of the primary pulse arrays have been made and at least three generally occuring pulse shapes have been observed. The pulse shapes and the probable forms of the particles producing each are illustrated in FIG. 9.

Figure 10:
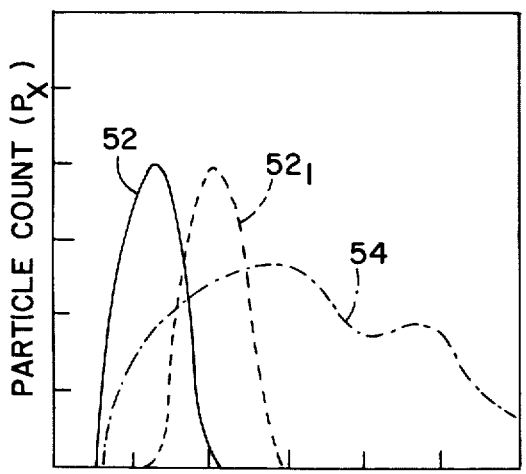
FIG. 10 is a graph of wave forms of particle population total count and size distribution curves derived in accordance with the invention.

It will be noted that, if uniform primary pulses are produced by the particle sensor during a run of a specimen having a symmetrical highly uniform particle population, a resultant change in the triggering of the secondary pulse generator results in a size shift in the multichannel analyzer that appears to indicate an increase in the diameter of the particles when displayed as an X-Y plot. As indicated in FIG. 10, there appears to be an increase in particle population diameter from curve 52 resulting from an 8-microsecond triggering into the primary pulse to curve $52_1$, produced by a 25-microsecond triggering.

It should be recognized that the increase in apparent diameter is artificial since the size index of a particle, be it diameter, volume, cross-sectional area, or any other dimension for which a calibration curve has been produced using a known particle population calibration standard is different for each trigger delay setting. Thus, in the curves in FIG. 10, all size calibration data, including that for the curve produced by the 25-microsecond triggering and all x-axis scales are given relative to the DM 8-microsecond calibration value ($b$ with respect to $a$ in FIG. 7, for example). Curves 52 and $52_1$ are produced by a symmetrical highly uniform particle population: using the same control parameters and a 25-microsecond triggering, a semi-random mixed particle population will result in an output substantially indentical to curve 54.

In practice, reference of pulse distributions to a single trigger delay, such as the aforementioned DM 8-microsecond calibration value, is useful since the delay triggering will produce changes in size indices of particles which will give characteristic complex pulse shapes that will be reflected in shifts in the multichannel analyzer plotted size distributions from those produced by the population of the same component particle mixes due to induced real changes in the size indices. In this invention, the assay date is based on differences from normals and, since the normals are catalogued empirically, the method of the two-point triggering embodiment requires only high precision to be effective. Thus, because empirical curves are catalogued for practicing the assay method of the invention, the calibration values used in the derivation of the curves, within reason, are not critical.

The techniques of utilizing single and multiple triggerings of secondary pulses with respect to a primary pulse from a particle sensor not only provides information about the particle or body being sensed and the sensor primary pulse resulting therefrom, which information is difficult to obtain by other means, but the technique also provides useful information about populations of bodies. For example, the multiple triggering into the sensor primary pulse of multiple secondary pulses during a specimen run through the sensing means enables a distinctive "signature" characterizing the particle population to be obtained in a single specimen run through the sensor. Where the equipment available does not have the speed and sensitivity that will permit a multiplicity of secondary pulses to be obtained during each primary pulse, a series of runs of the same single specimen through the equipment with the secondary pulse in each of the runs being triggered at different times into the primary pulse will also produce a distinctive signature characterizing the particle population.

Figure 11:
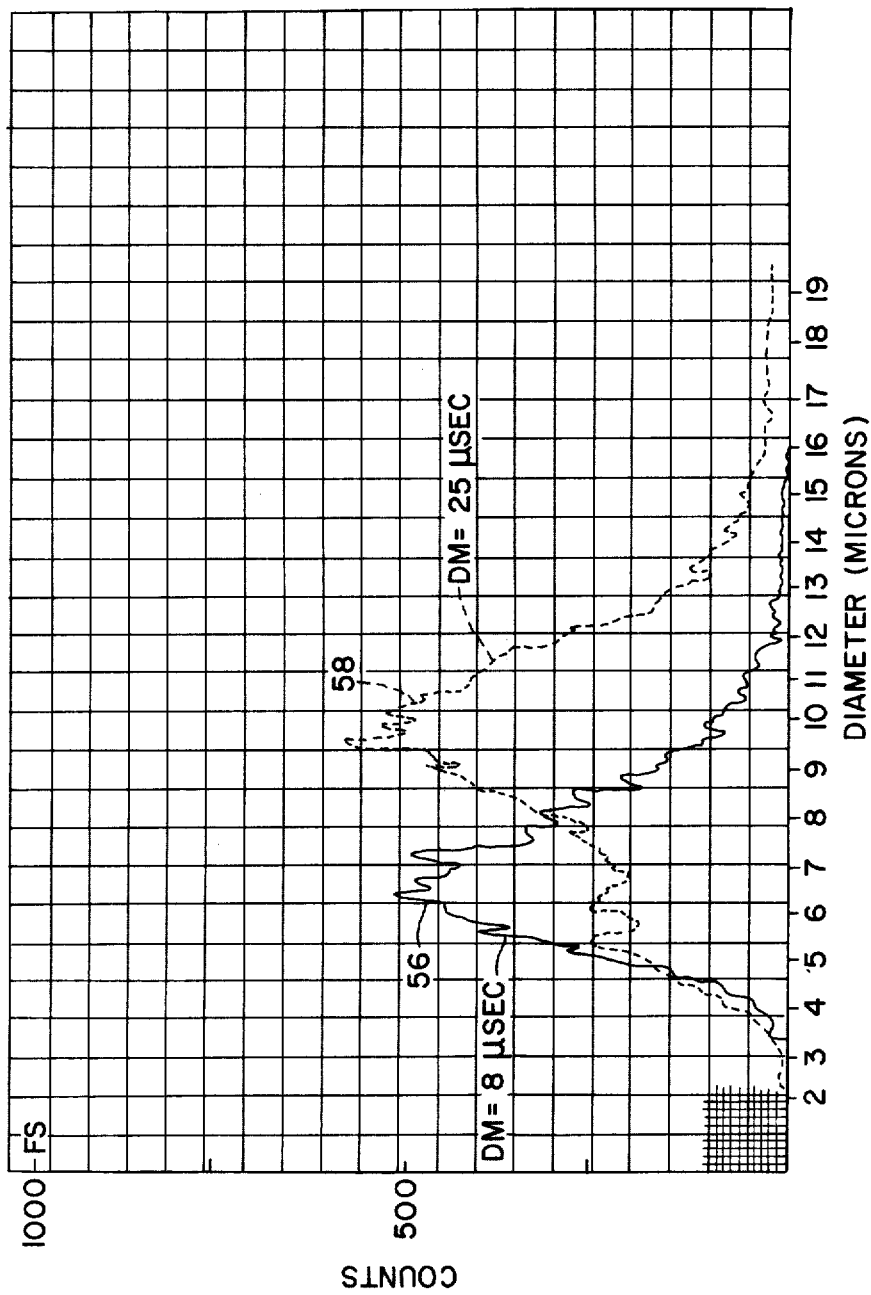
FIG. 11 is a graph of wave forms of normal *Fundulus heteroclitus* blood cell distribution curves derived in accordance with the invention.
Figure 12:
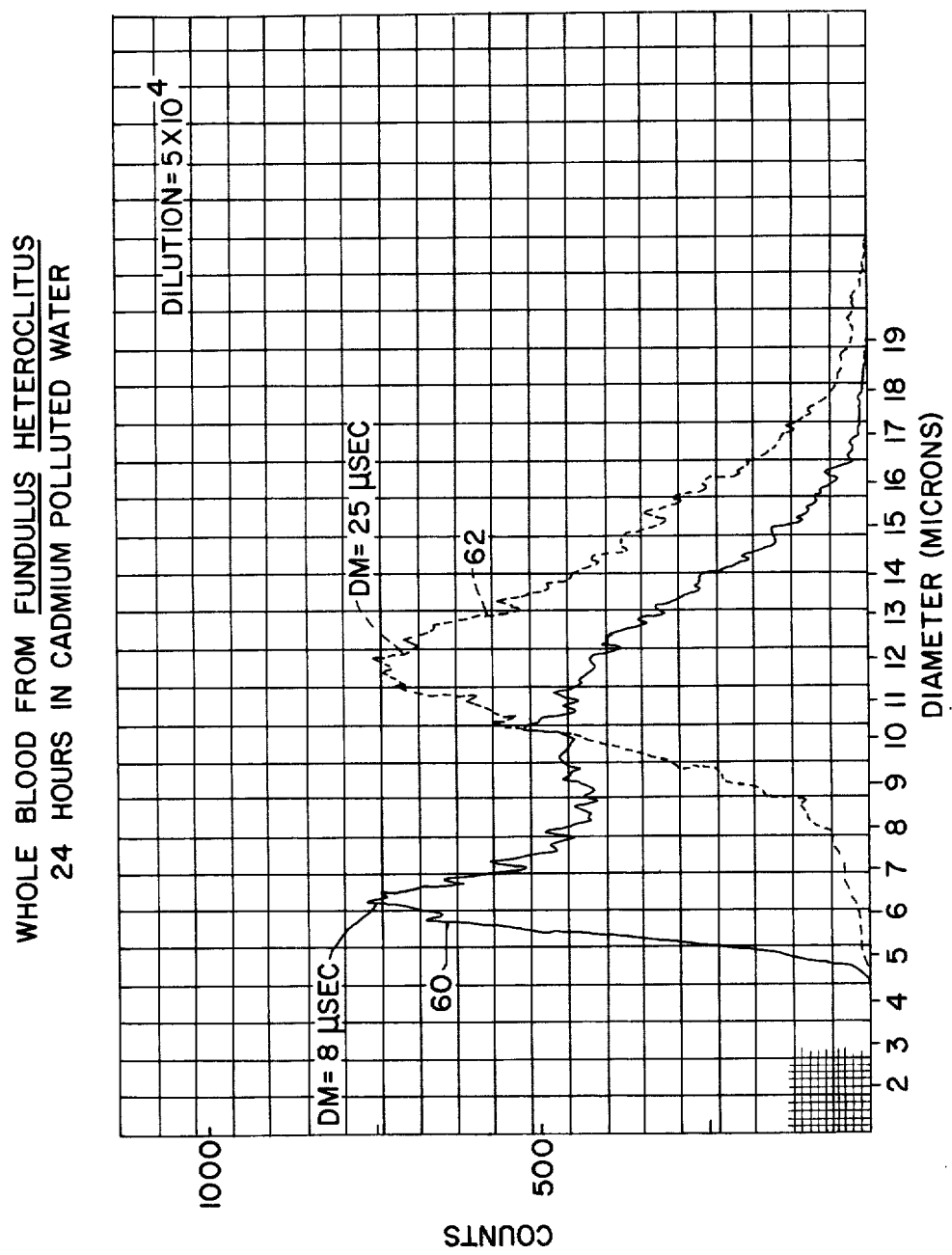
FIG. 12 is a graph similar to that of FIG. 11 showing the blood cells of *Fundulus heteroclitus* which had been held 24 hours in cadmium polluted water.

In a representative embodiment of the technique of this invention as used in a microbiological assay, a study was made of normal whole blood of the fish *Fundulus heteroclitus*. The equipment was calibrated to an 8-microsecond secondary pulse trigger delay and a 5 × $10^4$ dilution of the blood in 0.9%w/v particle free saline. A 100-micron aperture was used in the sensor. FIG. 11 shows two curves 56 and 58 resulting from secondary pulse triggerings of DM 8 and DM 25 microseconds respectively. The differences in pulse distributions resulting from the two different triggering times produces two distinctive curves. As an example of the power of this technique, reference is made to curves 60 and 62 of FIG. 12, which curves were also obtained in two samplings of a single specimen. In FIG. 12, the data presented were obtained also from an assay of whole blood from *Fundulus h.* in which equipment parameters and test conditions were identical to those yielding the data of FIG. 11 with the exception that curves 60 and 62 were derived from blood of fish which were held for 24 hours in water contaminated with 20 ppm of cadmium. A comparison of the curves of FIG. 11 with FIG. 12 will emphasize the fact that the technique of this invention permits the acquisition of meaningful data with a minimum of test runs for each specimen being studied. It will be noted that the general shapes of the particle population distribution acquire added emphasis because of the multi-point triggering such that the characterization of the bodies being studied is more readily obtained.

In the foregoing description of the invention, the particle sensor embodied in the invention operates to generate a voltage pulse as a result of the alteration by the test particle of a current flux in an aperture. Further embodiments of particle sensors employing optical techniques to generate a voltage pulse useable in the method of my invention are illustrated in FIGS. 13 and 14.

Figure 13:
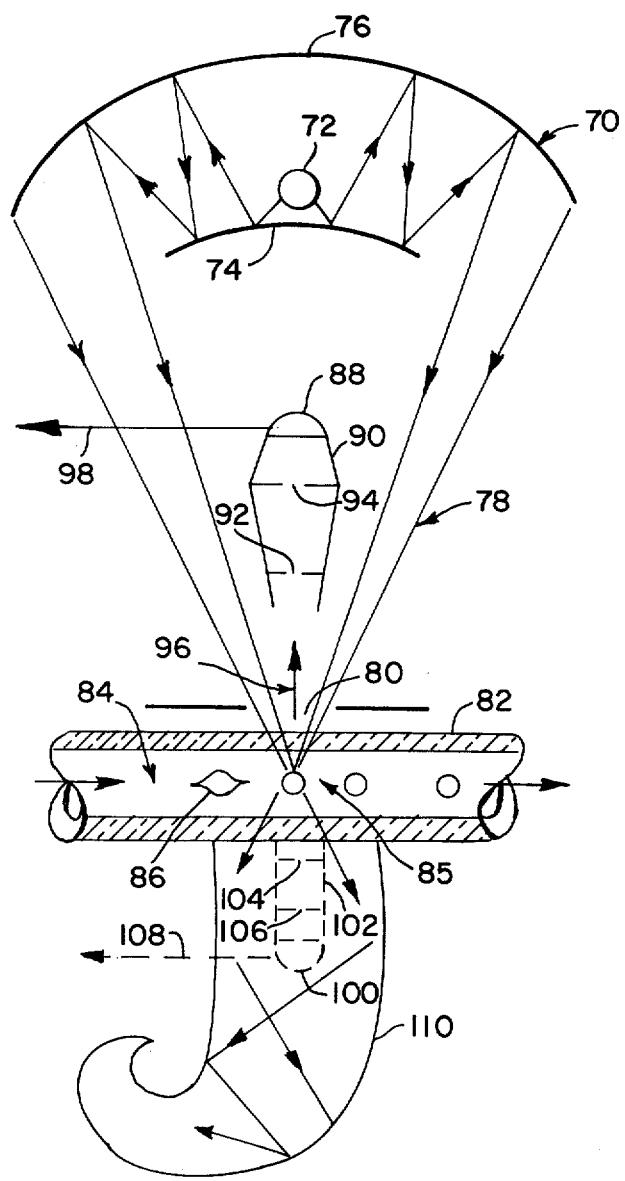
FIG. 13 is a schematic of optical sensing means in accordance with the invention.

Referring now to FIG. 13, the particle sensor 70 comprises a light source 72 of any appropriate type such as a tungsten or xenon lamp having a suitable response time and spectral characteristics. Focusing means such as pre-focus reflector 74 and focusing reflector 76 focus the light (indicated generally by rayed lines 78) from source 72 through a suitable anti-flare slit 80 into a transparent tube 82 through which a fluid 84 carrying the test speciments 86 in suspension is flowing. Fluid 84 can be of any appropriate type including a gaseous medium or a known suspension such as an isotonic NaCl solution, it being understood that the controlling characteristic of the fluid used is that it is transparent to the wavelengths of the light from source 72 such that the fluid itself does not contribute spurious signals during the test run. It will also be understood that the fluid used must not induce any unwanted physical changes in the bodies suspended therein. The sensing zone of sensor 70 is in tube 82 at and in the region surrounding the focal point 85 of the light beam. If the sensor is of an optical reflector type, a suitable photodetector 88 provided with an appropriate hood 90 and collimating slits 92 and 94 is provided to produce an electrical output or primary pulse that is a function of light 96 reflected off a particle passing through the sensing zone 85. Output signals from detector 88 are coupled through suitable interface lines 98 leading to processing means such as the amplifying means, multichannel analyzer, and the like, of the assay equipment of the invention embodied in FIGS. 1 and 2. The output signals from detector 88 are in the form of primary pulses whose heights or amplitudes are a function of the size, optical characteristics, and the like, of the particle.

Optical sensing means using refraction and absorption principles can also be used to generate the primary pulse utilized in the method of my invention. Such means which are indicated in dashed lines in FIG. 13 can comprise elements such as a photodetector 100, hood 102, collimating slits 104 and 106, and output interfacing 108. Photodetector 100 interposed in the path of the light beam from the light source 72 such that test particles passing through the sensing zone interrupt or diffract light falling on the photodetector such that output pulses result. A light trap 110 of any suitable known type is provided to absorb stray light to minimize the effects thereof.

Figure 14:
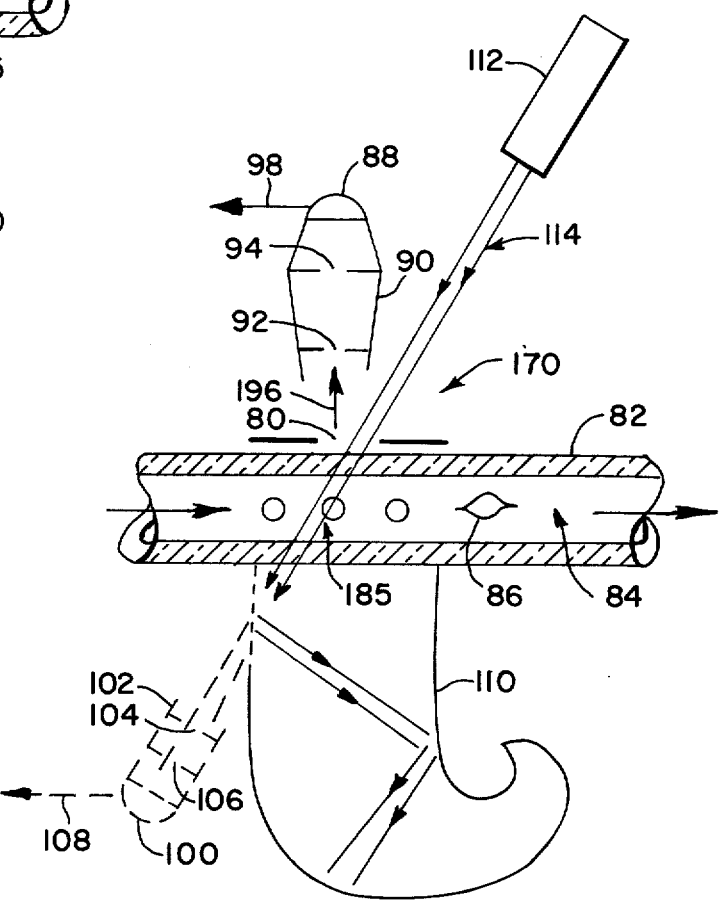
FIG. 14 is a schematic of a further embodiment of optical sensing means in accordance with the invention.

In the embodiment of FIG. 14, an appropriate laser 112 is utilized as the light source in the particle sensor 170. The output beam 114 of the laser is directed through a suitable antiflare slit 80 into a transparent tube 82 through which a fluid 84 carrying the test specimens 86 in suspension is flowing. Fluid 84 is of any suitable type having the characteristics set forth for the suspension fluid described for the FIG. 13 embodiment of the invention. The sensing zone of sensor 170 is in region 185 in tube 82 through which laser beam 114 passes. If the sensor is of an optical reflective type, a suitable photodetector 88, having an appropriate hood 90 and slits 92 and 94, is provided to produce an electrical output or primary pulse that is a function of light 196 reflected off a particle in sensing zone 185. Primary pulses from detector 88 which characterized the particles being analyzed are coupled through output lines 98 to processing equipment as described previously to accomplish the objects of my invention.

Optical sensing means using refraction principles as described previously, will have a suitable photodetector 100, hood 102, slits 104 and 106, and output interfacing 108 (shown in FIG. 14 in dashed lines). A light trap 110 of any suitable type is provided to absorb stray light to minimize the effects thereof. In operation, particles passing though sensing zone 185 interrupt or diffract the laser beam 114 falling on photodetector 100 such that primary output pulses useable in the invention result.

To avoid prolixity in the description of the embodiments of FIGS. 13 and 14 which use optical techniques in the particle sensor for producing an electrical primary pulse output that can be processed in accordance with the method of my invention, a listing of all of the optical, electrical, and mechanical characteristics of the various components of sensors 70 and 170 has not been attempted. The requirements of the various optoelectronic components are well known in the art and it is not believed that it will serve any useful purpose to go into further detail with respect to those components. As is known, if a xenon lamp such as a xenon flash tube manufactured by the Siemens Corporation, Iselin, N.J., is used as light source 72, photoemissive or simiconductor photodetectors having an appropriate frequency and response time will be used. A requirement for any light detector used is that it have a frequency response greater than about 10 K Hz. Representative examples of photodetectors 88 that can be used are low-density phototransistors of types similar to the Motorola MRD 810 or the Clairex 3030 marketed by Motorola Semiconductor Products Inc., Phoenix, Arizona and Clairex Electronics, Mount Vernon, New York, respectively. A large number of lasers, both of the gas and crystalline types, are commercially available for use and may be used with the above-mentioned sensors. An example of a well-known laser suitable for use is one of the heliumneon types manufactured by the Hughes Aircraft Company of Culver City, Ca.

The sensing zones 85 and 185 of sensors 70 and 170 can be coupled to the photodetectors 88 by means of known commercially available fiber optics such as a light pipe or optical waveguide having appropriate characteristics manufactured, for example, by the E. J. duPont de Nemours & Co., Wilmington, Delaware, or the Corning Glass Works, Corning, N.Y. In such configuration, not shown, a suitable glass or plastic fiberoptic cable has its input end exposed to the sensing zone 85 (or 185) of the particle sensor 70 (or 170) and its output end directed at the photosensitive surface of photodetectors 88.

Although shown and described in what is believed to be the most practical and preferred embodiments, it is apparent that departures from the specific process and apparatus described will suggest themselves to those skilled in the art and may be made without departing from the spirit and scope of the invention. I, therefore, do not wish to restrict myself to the particular methods illustrated and described, but desire to avail myself of all modifications that may fall within the scope of the appended claims.

Having thus described my invention, what I claim is:

1. A method for analyzing micron- and submicron-sized bodies such as particles, cells, and organisms, to determine various characteristics such as sizes, shapes, and number, and for studying the dynamics of cellular growth and changes and rates of changes in sizes, shapes, and number of cells in living populations of organisms which comprises:

passing a given sample of said bodies in a fluid suspension through particle-detecting means to produce a primary voltage pulse as a function of dimensional characteristics of each body detected thereby;

feeding each of said primary pulses to secondary pulse producing means;

Actuating trigger means in said secondary pulse producing means during the duration of each of said primary pulses to produce secondary voltage pulses whose amplitude reflects the relative amplitude at the time of said triggering of said primary pulse associated therewith; and Indicating the amplitude of said secondary pulses whereby indications of said amplitudes of said secondary pulses can be used to reflect the shape of said associated primary pulses at the times of said triggerings such that the bodies being analyzed can be characterized.

2. The method of claim 1 wherein a pulse height analyzer across the output of the detecting means is employed to obtain indications of the total number of bodies and their size distribution.

3. The method of claim 1 wherein the primary pulse produced by the detecting means is a function of the size of the bodies, the diameter and length of the aperture, the flow rate of the fluid suspension, and the path of said bodies through said aperture, and wherein the secondary pulses are fixed duration, uniformly shaped pulses.

4. The method of claim 1 wherein the fluid suspension is drawn through the aperture by a pressure differential.

5. The method of claim 1 wherein the given sample is passed through the particle-detecting means at least twice.

6. The method of claim 5 wherein the time of triggering of the secondary pulses into the primary pulse of each of the successive passages of the sample through the particle detecting means is varied.

7. The method of claim 1 wherein the given sample is passed successively at predetermined time intervals through the detecting means and wherein the indications obtained from said successive passages of said sample are compared to identify changes in the bodies therein.

8. The method of claim 1 wherein the trigger means are set to trigger at least twice during the duration of each of the primary pulses such that at least first and second secondary pulses are produced for each of the associated primary pulses.

9. The method of claim 8 wherein the time of triggering of the secondary pulses into the primary pulse of each of the successive passages of the sample through the particle detecting means is varied.

10. The method of claim 1 wherein indications of the amplitudes of the secondary pulses are compared to thereby provide an analysis of the shape of the associated primary pulses which can be used to characterize the bodies being analyzed.

11. The method of claim 1 wherein the trigger means are set to trigger a multiplicity of times at fixed intervals and wherein the multiplicity of triggerings produce a number of secondary pulses sufficient to profile the assocaited primary pulses.

12. The method of claim 1 wherein the area under each of the secondary pulses is integrated and the areas of said secondary pulses of each associated primary pulse are then summed such that the volume of each of the bodies being sampled can be obtained.

13. The method of claim 1 wherein the particle detecting means is an electrical sensor and wherein the fluid suspension is electrically conductive.

14. The method of claim 1 wherein the particle detecting means is an electric field which is provided by passing a current between two electrodes in the conductive fluid suspension spaced from one another in electrically insulated vessels which communicate with each other by means of an aperture.

15. The method of claim 1 wherein the particle detecting means is an optoelectronic sensor and wherein the fluid suspension comprises a fluid transparent to the wavelength of the radiation utilized in said sensor.

16. The method of claim 15 wherein the sensor comprises a radiation source which directs radiation into a sensing zone through which the given samples of bodies are passed and photodetection means which produce the primary pulse as a function of the interaction of said bodies with said radiation.

17. The method of claim 16 wherein the radiation source is a laser.

18. The method of claim 15 wherein the interaction of the bodies with the radiation is by optical refraction.

19. The method of claim 15 wherein the interaction of the bodies with the radiation is by optical absorption.

20. The method of claim 16 wherein the radiation source is a lamp having an incoherent output.

21. The method of claim 16 wherein the interaction of the bodies with the radiation is by optical reflection.

* * * * *

UNITED STATES PATENT OFFICE
CERTIFICATE OF CORRECTION

Patent No. 3,919,050              Dated Nov. 11, 1975

Inventor(s) William A. Curby

It is certified that error appears in the above-identified patent and that said Letters Patent are hereby corrected as shown below:

Column 2, line 24, "if" should read --is--.
Column 3, line 26, "if" should read --is--;
           line 45, "hydrodynamcis" should read --hydrodynamics--;
           line 52, before "when" insert --resulting--.
Column 4, line 56, "ae" should read --are--.
Column 7, line 1, before "progression" insert --the--.
Column 8, line 44, "pulses" should read --pulse--.
Claim 18, "15" should read --17--.
Claim 19, "15" should read --17--.

Signed and Sealed this second Day of March 1976

[SEAL]

Attest:

RUTH C. MASON
*Attesting Officer*

C. MARSHALL DANN
*Commissioner of Patents and Trademarks*